June 18, 1968 H. B. BRIGGS ETAL 3,389,264
RADIATION DETECTOR WITH GUARD RING DETECTOR
Filed Oct. 7, 1963

INVENTORS.
HOWARD B. BRIGGS,
WALTER H. KONKEL,
BY John M. Koch
ATTORNEY.

3,389,264
RADIATION DETECTION WITH GUARD
RING DETECTOR
Howard B. Briggs and Walter H. Konkel, Santa Barbara,
Calif., assignors to Santa Barbara Research Center,
Goleta, Calif., a corporation of California
Filed Oct. 7, 1963, Ser. No. 314,110
6 Claims. (Cl. 250—211)

This invention relates to a radiation detector circuit and technique, particularly an infrared radiation detector employing a guard ring for the suppression of noise, thereby enhancing the signal-to-noise ratio.

It is among the objects of this invention to provide a detector of radiation which functions by utilizing the change in resistance of a semiconductor on exposure to radiation of a suitable wavelength and exhibits a high signal to noise ratio by by-passing the noise signals from the detector.

A description of the invention is given below with reference to the accompanying drawing, wherein.

Figure 1:
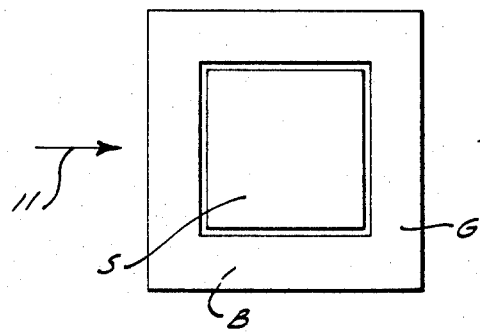
FIG. 1 is a plan view showing the signal electrode area of the detector surrounded by the guard ring.

The device of this invention employs a slab or slice of bulk semiconductor material as the radiation sensitive element. It is fabricated in such a way as to enable the device to operate at a high signal to noise ratio. This is accomplished by an electrode configuration which, together with auxiliary voltages, is favorable to the generation of the maximum signal for a given flux density of radiation, and at the same time allows the by-passing of a considerable portion of the noise which normally accompanies the signal.

For a sample of semiconductive material of resistance $R_c$ in series with a load resistance $R_1$ and biasing voltage $V$ it can be shown that the signal voltage $V_s$ is given by $$V_s = V \frac{\Delta R_c R_1}{(R_c + R_1)^2}$$

where $\Delta R_c$ is the change in resistance of $R_c$ caused by the radiation. For $R_c = R_1 = R$ this becomes $$V_s = V \frac{\Delta R}{4R}$$

which may be written $$V_s = V \frac{\Delta n}{4n}$$

where $n$ = number per cc. of carriers of electricity normally present in the material and $\Delta n$ the number per cc. of carriers generated by the radiation. An object in this design is that $\Delta n/n$ shall be large. It is to be noted that the maximum signal depends on utilizing for signal purposes that volume of the semiconductor for which the density of light generated carriers is greatest.

Another consideration in design is that the noise signal should be low. It has been established by experiment that a major portion of the noise is generated at or near the surface of the semiconductor. An important feature of this design is the provision for by-passing a major portion of the surface currents so as to by-pass the noise generated near the surface, and at the same time utilizing a favorable $\Delta n/n$.

In a particular embodiment illustrative of the features of this invention, a body of semiconductor material, for example, gold-doped germanium, is used as the light sensitive material. This is cut into a rectangular block 10, for example, 4 mm. x 4 mm. x 2 mm. Two opposing 4 mm. x 4 mm. faces are gold plated for contacts. On one of these faces the plating is applied so as to provide a guard ring G surrounding the central plated area S. The guard ring area electrode G is insulated from the signal electrode area S by the space therebetween as shown in the drawings, for example FIGS. 1 and 2. On the other side the plating B is continuous over the whole area. Such a unit is shown in plan and section in FIGS. 1 and 2, respectively. The arrows at 11 indicate infrared radiation.

The function of the guard ring G with its associated bias voltage $V_2$ is to confine the lines of current flow of the signal electrode S to the body, or interior volume, of the semiconductor material 10. The signal carrying current is thus largely free of the noise generated at or near the surface of the semiconductor 10. The base electrode B is connected to guard ring bias voltage $V_2$ and signal plate bias voltage $V_1$. $R_1$ is the load resistance and $V_s$ represents the signal voltage.

Figure 2:
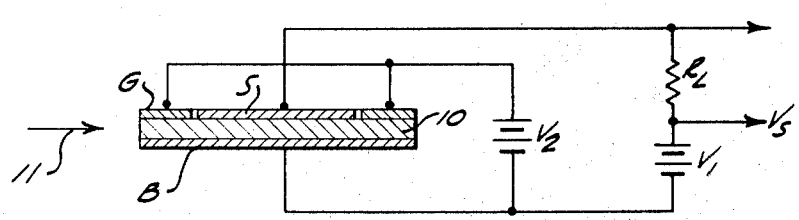
FIG. 2 is a vertical sectional view of the detector and guard ring of FIG. 1 connected to auxiliary detector circuitry.

The sample geometry described together with the electrode arrangement of FIGS. 1 and 2 make possible the utilization of that volume of the semiconductor sample 10 for which $\Delta n/n$ is at or near its maximum value. This is accomplished in the particular embodiment shown in FIGS. 1 and 2 by having the signal producing volume close to the incidence end of the sample 10. The arrangement shown favors the utilization of reflected energy, in that absorption losses in regions which do not contribute to the signal, are kept low.

A feature of this design is that the volume of semiconductor material 10 affected by the guard ring G serves as a filter for the radiation which excites intrinsic photoconductivity. Radiation 11 pases through the crystal 10 in the region of the guard ring G and into the portion of the crystal 10 in the region of the guard ring gap S. Energy deposit in the portion of the crystal adjacent the guard ring G contributes to the guard ring current, and thus energy of the short wavelength end of the energy spectrum is accordingly filtered out of the signal because it does not penetrate to the portion of the crystal adjacent the signal electrode S.

Figure 3:
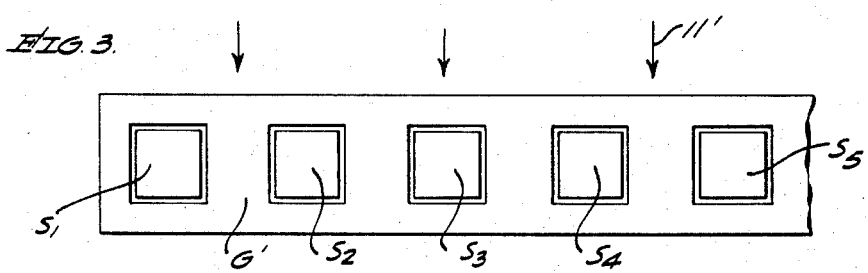
FIG. 3 is a view similar to that of FIG. 1 showing an array of detectors.
Figure 4:
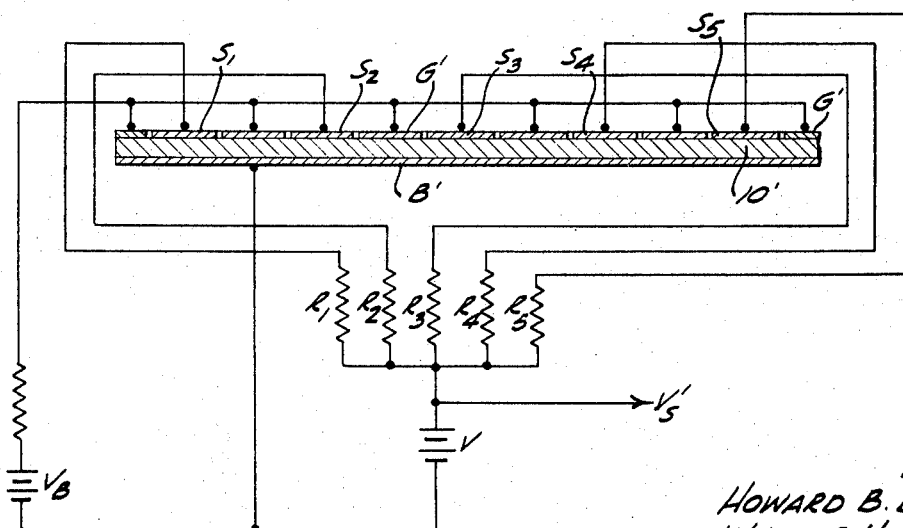
FIG. 4 is a view similar to that of FIG. 2 showing the array of detectors of FIG. 3 connected to auxiliary detector circuitry.

The device described in connection with FIGS. 1 and 2 comprises a single photoelectric cell. It is conceived as possible to construct an array of photoelectric cells $S_1$, $S_2$, $S_3$, $S_4$, $S_5$, etc., using a single block G' of photoconductive material, as shown in FIGS. 3 and 4. By a suitable disposition of electrodes and biasing voltages V for the signal plates and $V_B$ for the guard ring, the advantage described for a single unit are preserved, and the several cells function independently.

The guard ring G' insures that the lines of current flow of each signal electrode $S_1$, $S_2$, $S_3$, $S_4$, $S_5$, etc., are confined to the volume of semiconductor material 10' defined by that signal electrode. Because of this, each cell functions independently of the others. $R_1$, $R_2$, $R_3$, $R_4$ and $R_5$ are the load resistances for the respective signal electrodes and B' is the base electrode. $V'_s$ is the signal voltage and the arrows at 11' indicate infrared radiation.

A single detector fabricated in accordance with the embodiment of the invention illustrated in FIGS. 1 and 2, and using the guard ring as described thereinabove, gave an improvement of 6.85 in signal to noise ratio over a detector without the guard ring. With the guard ring biased equal to the detector, the noise was reduced by a factor of 5.

Thus, it is seen that the use of the guard ring radiation detector of the invention greatly improves the signal to noise ratio by markedly reducing the noise of the detector.

Obviously many other modifications and variations of the present invention are possible in the light of the above teachings. It is therefore to be understood that, within the scope of the appended claims, the invention can be practiced otherwise than as specifically described.

What is claimed is:

1. A radiation detector device comprising a slab of semiconductor material, a signal electrode conductor area on one side of the slab, a guard ring conductor area surrounding the signal area on said side of the slab and insulated from the signal electrode area, a base electrode conductor area on the other side of the slab, a signal plate bias circuit between the signal conductor area and the base conductor area, and a guard ring bias circuit between the guard ring conductor area and the base conductor area.

2. A radiation detector device according to claim 1, wherein the slab of semiconductor material is sensitive to infrared radiation.

3. A radiation detector device comprising a slab of semiconductor material, an array of signal electrode conductor areas on one side of the slab, a guard ring conductor area surrounding the signal areas on said side of the slab and insulated from the signal electrode areas, a base electrode conductor area on the other side of the slab, signal plate bias circuits between the signal conductor areas and the base conductor area, and a guard ring bias circuit between the guard ring conductor area and the base conductor area.

4. A radiation detector device according to claim 3, wherein the slab of semiconductor material is sensitive to infrared radiation.

5. The method of detecting infrared radiation, comprising: applying a bias voltage across a slab of infrared radiation sensitive semiconductor material between a signal plate electrode and a base plate electrode; applying a bias voltage across the slab from a guard ring electrode to the base electrode, with the guard ring electrode being connected to a guard ring conductor area on the slab encircling the signal plate; subjecting the slab to infrared radiation in a manner to pass such radiation between the signal plate and the base electrode; and detecting the radiation caused current flowing between the signal plate and the base plate.

6. The method of detecting infrared radiation, comprising: applying bias voltages across a slab of infrared radiation sensitive semiconductor material between a plurality of signal electrodes and a common base electrode; applying a bias voltage across the slab from a guard ring electrode to the base electrode, with the guard ring electrode being connected to a guard ring conductor area on the slab encircling each of the signal plates; subjecting the slab to infrared radiation in a manner to pass such radiation between at least one of the signal plates and the base electrode; and detecting the radiation caused current flowing between at least one of the signal plates and the base plate.

References Cited
UNITED STATES PATENTS

| | | | |
|---|---|---|---|
| 2,560,606 | 7/1951 | Shive | 250—211 |
| 2,582,850 | 1/1952 | Rose | 250—211 |
| 2,629,800 | 2/1953 | Pearson | 338—15 |
| 2,951,175 | 8/1960 | Null | 250—83.3 |
| 3,113,220 | 12/1963 | Goulding et al. | 250—83.3 |

RALPH G. NILSON, *Primary Examiner.*

M. ABRAMSON, *Assistant Examiner.*